United States Patent [19]

Iguchi et al.

[11] Patent Number: 5,767,212
[45] Date of Patent: Jun. 16, 1998

[54] METHOD OF PRODUCING SULFUR CONTAINING COLOR-FREE TRANSPARENT (METHA) ACRYLATE POLYMER HAVING HIGH VISIBLE LIGHT TRANSMITTANCE

[75] Inventors: Yuichiro Iguchi; Setsuo Baba, both of Otsu; Koichiro Oka, Ibaraki, all of Japan

[73] Assignee: Toray Industries, Inc., Tokyo, Japan

[21] Appl. No.: 775,794

[22] Filed: Dec. 31, 1996

Related U.S. Application Data

[63] Continuation of Ser. No. 199,195, Jul. 8, 1994, abandoned.

[30] Foreign Application Priority Data

Jun. 30, 1992 [JP] Japan .................. 4-172793

[51] Int. Cl.$^6$ ............................................. C08F 2/02
[52] U.S. Cl. .................. 526/210; 526/212; 526/223; 526/224
[58] Field of Search ........................ 526/210, 211, 526/212, 213, 214, 217, 223, 224

[56] References Cited

U.S. PATENT DOCUMENTS

| | | | |
|---|---|---|---|
| 5,011,897 | 4/1991 | Amano | 526/202 |
| 5,214,116 | 5/1993 | Matsuoka | 526/286 |
| 5,294,690 | 3/1994 | Iguchi | 526/286 |
| 5,349,035 | 9/1994 | Brand | 526/284 |

FOREIGN PATENT DOCUMENTS 351612  12/1992  Japan .

*Primary Examiner*—Christopher Henderson
*Attorney, Agent, or Firm*—Morrison & Foerster

[57] ABSTRACT

The present invention relates to a method of producing a sulfur-containing transparent polymer by polymerizing a composition containing a (metha)acrylate monomer having sulfur in its molecule, characterized by radical polymerization of a composition containing at least one compound selected from radical chain transfer compounds and radical trapping compounds in an amount of 0.1 to 7.0% by weight of the total amount of the composition. The polymer obtained by polymerization is less colored. The method can provide a polymer having a high total light transmittance, a high refractive index and a light weight and is hardly yellowed during use.

13 Claims, No Drawings

METHOD OF PRODUCING SULFUR CONTAINING COLOR-FREE TRANSPARENT (METHA) ACRYLATE POLYMER HAVING HIGH VISIBLE LIGHT TRANSMITTANCE

This application is a continuation of U.S. application Ser. No. 08/199,195, filed Feb. 28, 1994, now abandoned.

TECHNICAL FIELD

The present invention relates to a method of producing a transparent polymer which is preferably used for optical applications including plastic lenses such as a corrective lens, a sunglasses lens, a fashion lens, a camera lens, an optical device lens, a prism and the like.

The present invention also relates to a method of producing a transparent polymer which is useful as an adhesive for bonding optical articles.

BACKGROUND ART

An olefin thermosetting resin generally has excellent thermal resistance and chemical resistance.

Although diethylene glycol bisacrylcarbonate is widely used when optical applications such as spectacle lenses and the like, it causes the problem of low refractive index in decreasing the thickness and weight of a lens.

In order to solve this problem, a resin containing sulfur atoms (refer to Japanese Patent Laid-Open Nos. 63-316766, 63-162671 and 63-188660) has been proposed.

A resin having a refractive index of 1.62 to 1.64 has also been proposed in Japanese Patent Laid-Open No. 2-158612.

However, when a resin is produced by radical polymerization of a monomer containing sulfur atoms, critical defects such as coloring of the obtained resin and internal strain sometimes occur in use for optical applications.

As a result of intensive research on a method of obtaining a transparent polymer from a (metha)acrylate monomer containing sulfur atoms, a method was found for producing a sulfur-containing transparent polymer which is less colored during polymerization (i.e. improved in hue), which is hardly yellowed under use conditions, and which has a high visible light transmittance, a high refractive index and a light weight. The present invention has been achieved on the basis of this method.

DISCLOSURE OF THE INVENTION

The present invention relates to a method of producing a sulfur-containing transparent polymer by polymerization of a composition containing a (metha)acrylate monomer containing a sulfur in its molecule, the method comprising radical polymerization of a composition containing at least one compound selected from radical chain transfer compounds and radical trapping compounds in an amount of 0.1 to 0.7% by weight of the total weight of the composition.

The (metha)acrylate monomer containing a sulfur in its molecule used in the present invention may contain at least one sulfur atom, and is obtained by reacting a compound containing a sulfur atom and a hydroxyl group or a compound containing a mercapto group and (metha)acrylic acid, (metha)acrylate, or (metha)acrylic halide in the presence of an alkali or acid.

Examples of the (metha)acrylate monomer containing at least one sulfur atom in its molecule used in the present invention include the compounds below.

Examples of compounds each having a (metha)acrylate group include the following compounds:

(metha)acrylate compounds such as methyl mercaptan, ethyl mercaptan, thiophenol, mercaptoethyleneoxybenzene, mercaptopropyleneoxybenzene, mecraptoethylene thiomethylenebenzene, mercaptopropylene thiomethylenebenzene, hydroxyethylene thiobenzene, hydroxypropylene thiobenzene, hydroxyethylene thiomethylenebenzene, hydroxypropylene thiomethylenebenzene and the like; and compounds obtained by substituting the benzine rings of the (metha)acrylate compounds with naphthalene or diphenyl rings.

Examples of compounds each having at least two (metha) acrylate groups which are used as the (metha)acrylate monomer containing at least one sulfur atom in its molecule in the present invention include the following compounds:

(metha)acrylate compounds such as 1,2-dimercaptoethane, 1,3-dimercaptopropane, 1,4-dimercaptobutane, 2-mercaptoethanol, mercaptoethylsulfide, mercaptoethyl ether, hydroxyethylsulfide, pentaerythritol tetrakisthioglycolate, pentaerythritol tetrakisthiopropionate, 4,4-hydroxyphenylsulfide, 1,4-bis(hydroxyethylenethio)benzene, 1,4-benzenedithiol, 1,3-benzenedithiol, 1,2-benzenedithiol, 4-t-butyl-1,2-benzenedithiol, 1,2-bis(mercaptomethylene)benzene, 1,3-bis(mercaptomethylene)benzene, 1,4-bis(mercaptomethylene)benzene, 1,2-bis(mercaptoethylene)benzene, 1,3-bis(mercaptoethylene)benzene, 1,4-bis(mercaptoethylene)benzene, 1,2-bis(mercaptoethylene)benzene, 1,3-bis(mercaptomethylenethio)benzene, 1,4-bis(mercaptomethylenethio)benzene, 1,2-bis(2-mercaptoethylenethio)benzene, 1,3-bis(2-mercaptoethylenethio)benzene, 1,4-bis(2-mercaptoethylenethio)benzene, 1,2-bis(2-mercaptoethylenethio)benzene, 1,3-bis(2-mercaptoethylenethiomethylene)benzene, 1,4-bis(2-mercaptoethylenethiomethylene)benzene, 1,4-bis(2-mercaptoethylenethiomethylene)benzene, 4,4-thiodithiophenol, 4,4-biphenyldithiol, 1,2-bis(mercaptomethyleneoxy)benzene, 1,3-bis(mercaptomethyleneoxy)benzene, 1,4-bis(mercaptomethyleneoxy)benzene, 1,2-bis(mercaptoethyleneoxy)benzene, 1,3-bis(mercaptoethyleneoxy)benzene, 1,4-bis(mercaptoethyleneoxy)benzene, 1,4-bis(mercaptoethyleneoxy)benzene, 1,4-bis(hydroxyethylenethio)benzene, 1,4-bis(2-hydroxyethylenethiomethylene)benzene, 1,4-bis(2-mercaptoethyleneoxymethylene)benzene, 1,3,5-trimercaptobenzene and the like.

A compound having a thiol (metha)acrylate group is preferably used as the (metha)acrylate compound in the present invention so that a resin having a high refractive index can be obtained.

It is also preferred for obtaining a polymer having high hardness and resistance to thermal softening to use a compound having at least two (metha)acrylate groups.

In investigation in the present invention, it was found that usual radical polymerization of the (metha)acrylate monomer containing at least one sulfur atom in its molecule produces a polymer which is easily tinged with yellow or red, and cannot easily produce a polymer having a uniform hue.

In the present invention, it was thus found that the hue of the polymer produced by polymerization can be stably improved by a method of adding at least one compound selected from chain transfer compounds and radical trapping compounds.

Examples of the chain transfer compounds and radical trapping compounds used in the present invention are set forth below.

Mercaptan compounds such as ethyl mercaptan, hexyl mercaptan, octyl mercaptan, dodecyl mercaptan, stearyl mercaptan, mercaptoethanol, 1,2-ethanedithiol, 1,3-propanedithiol, 1,6-hexanedithiol, 1,12-dodecanedithiol, mercaptomethylsulfide, 2-mercaptoethylsulfide, 3-mercaptopropylsulfide, 6-mercaptohexylsulfide, 1,2-bis-2-mercaptoethylthioethane, 1,2-bis-3-mercaptopropylthioethane, 1,3-bis-2-mercaptoethylthiopropane, 1,4-bis-2-mercaptoethylthiobutane, 1,6-bis-2-mercaptoethylthiohexane, bis-2-(2-mercaptoethylthio)ethylsulfide, 2-mercaptoethyl ether, 3-mercaptopropyl ether, 6-mercaptohexyl ether, 1,4-cyclohexanedithiol, bis-2-mercaptoethoxymethane, 1,2-bis-2-mercaptoethoxyethane, bis-2-(2-mercaptoethoxy)ethyl ether, 1,4-benzenedithiol, 1,3-benzenedithiol, 1,2-benzenedithiol, 4-t-butyl-1,2-benzenedithiol, 1,2-bis(mercaptomethylene)benzene, 1,3-bis(mercaptomethylene)benzene, 1,4-bis(mercaptomethylene)benzene, 1,2-bis(mercaptoethylene)benzene, 1,3-bis(mercaptoethylene)benzene, 1,4-bis(mercaptoethylene)benzene, 1,2-bis(mercaptomethylenethio)benzene, 1,3-bis(mercaptomethylenethio)benzene, 1,4-bis(mercaptomethylenethio)benzene, 1,2-bis(2-mercaptoethylenethio)benzene, 1,3-bis(2-mercaptoethylenethio)benzene, 1,4-bis(2-mercaptoethylenethio)benzene, 1,2-bis(2-mercaptoethylenethiomethylene)benzene, 1,3-bis(2-mercaptoethylenethiomethylene)benzene, 1,4-bis(2-mercaptoethylenethiomethylene)benzene, 1,2-bis(mercaptomethyleneoxy)benzene, 1,3-bis(mercaptomethyleneoxy)benzene, 1,4-bis(mercaptomethyleneoxy)benzene, 1,2-bis(2-mercaptoethyleneoxy)benzene, 1,3-bis(2-mercaptoethyleneoxy)benzene, 1,4-bis(2-mercaptoethyleneoxy)benzene, 4,4-thiodithiophenol, 4,4-biphenyldithiol, 1,3,5-trimercaptobenzene, trimercaptoethylisocyanurate, pentaerythritol tetrathioglycolate, pentaerythritol trithioglycolate, pentaerythritol dithioglycolate, pentaerythritol tetramercaptopropionate, pentaerythritol trimercaptopropionate, pentaerythritol dimercaptopropionate, trimethylolpropane trithioglycolate, trimethylolpropane dithioglycolate, trimethylolpropane trimercaptopropionate, trimethylolpropane dimercaptopropionate, mercaptopropylisocyanurate and the like.

Disulfide, trisulfide or tetrasulfide compounds such as diethyl disulfide, dipropyl disulfide, dibutyl disulfide, dihexyl disulfide, dioctyl disulfide, didecyl disulfide, diphenyl disulfide, tetraethylthiuram disulfide, p,p-ditolyl trisulfide, dibenzyl tetrasulfide, and the like.

Allyl compounds such as allyl acetate, allyl propionate, allyl ethyl carbonate, allyl laurate, allyl benzoate, allyl methyl ether, allyl sulfide, diethylene glycol diallyl carbonate, diallyl terephthalate, diallyl isophthalate, diallyl phthalate and the like.

So-called polymerization inhibitors or antioxidants each having a phenolic OH group, such as 2,6-di-t-butyl-4-methylphenol, 4-methoxyphenol, 4-t-butylcatechol, hydroquinone and the like.

Aldehyde compounds such as butyl aldehyde, octyl aldehyde, dodecyl aldehyde, stearyl aldehyde, benzaldehyde, benzyl aldehyde and the like.

Benzyl alcohol compounds such as benzyl alcohol, vinyl benzyl alcohol, 2-phenyl-2-propanol, 3,4-dimethyl benzyl alcohol, p-t-butyl benzyl alcohol and the like.

Aliphatic carbon halide compounds such as carbon tetrachloride, carbon tetrabromide, carbon tetraiodide and the like.

Aromatic nitro or nitroso compounds such as nitrobenzene, nitrosobenzene and the like.

Of these compounds, the mercaptan compounds are preferably used in the present invention.

It was also found that the use of a mercaptan compound and a compound having a phenolic OH group further improves the transparency of the resin produced.

The amount of the chain transfer compound and radical trapping compound used in the present invention is preferably at least 0.1% by weight, more preferably at least 1.0% by weight, in total of at least one compounds selected. If the amount is less than 0.1% by weight, the hue of the polymer produced by polymerization cannot be easily improved. If the amount of the chain transfer compound and radical trapping compound used in the present invention is large, the mechanical properties of the polymer produced by polymerization deteriorates, or these compounds possibly bleed out during use. Thus, the amount is preferably less than 7.0% by weight. Further, the ratio of the total moles of the mercapto groups and phenolic OH groups of the compounds added to the moles of (metha)acrylate groups preferably satisfies the following relation:

$$0.01 < \frac{\text{(moles of mercapto groups)} + \text{(moles of phenolic OH groups)}}{\text{moles of (metha) acrylate groups}} < 0.07$$

In this case, the mercapto compound and the compound having a phenolic OH group are preferably used in amounts of 1.0 to 5.0% by weight and 0.1 to 1.0% by weight, respectively.

Copolymerization can be made by adding another monomer which is radical-polymerizable to the (metha)acrylate monomer containing at least one sulfur atom. The monomer added is not limited so far as it is an olefin compound. (Metha)acrylic compounds, styrene compounds, acrylonitrile and N-phenylmaleimide are preferred. Examples of such compounds include methyl (metha)acrylate, ethyl (metha)acrylate, propyl (metha)acrylate, benzyl (metha)acrylate, phenyl (metha)acrylate, cyclohexyl (metha)acrylate, cyclohexylmethylene (metha)acrylate, styrene, vinylnaphthalene, halogenated styrene, α-methylstyrene and the like.

When the resin produced is used for application which requires a polishing process and a surface coating process, copolymerization with a monomer having at least two radical-polymerizable functional groups in its molecule can produce a resin having excellent thermal resistance and a crosslinked structure. The monomer having at least two radical-polymerizable functional groups in its molecule is not limited. Examples of such a monomer include divinylbenzene, diallylphthalate, ethylene glycol di(metha)acrylate, diethylene glycol di(metha)acrylate, triethylene glycol di(metha)acrylate, bisphenol A-di(metha)acrylate, bisphenol A-dihydroxyethyl (metha)acrylate, tetrabromo-bisphenol A-di(metha)acrylate, tetrabromo-bisphenol A-dihydroxyethyl (metha)acrylate, triallylisocyanurate, pentaerythritol tetrakis(metha)acrylate, pentaerythritol tris (metha)acrylate, diethylene glycol bisallylcarbonate and the like.

However, the amount of the monomer added for copolymerization is preferably not more than 50% by weight of the total of the monomer composition from the viewpoint of the optical characteristics of the resin obtained.

Additives such as an ultraviolet absorber and an antioxidant are added to the adjusted monomers obtained so as to prevent light or thermal yellowing of the polymer produced by polymerization under use conditions.

An optical polymerization initiator such as benzophenone or the like or a thermal polymerization initiator such as a peroxide or azo compound is generally added for facilitating polymerization in the subsequent polymerization process.

Although various known polymerization initiators can be used, a desired reaction temperature is selected for use.

Examples of such initiators include benzoylperoxide, di-iso-propylperoxycarbonate, di-iso-propylperoxydicarbonate, di-2-ethylhexylperoxydicarbonate, di-n-propylperoxydicarbonate, t-butylperoxy-2-hexylhexanate, azobisisobutyronitrile and the like.

The transparent polymer of the present invention can be produced by polymerization using the adjusted monomer obtained. Polymerization using a mold is described below as an example.

The cavity between two molds having a constant shape is filled with the adjusted monomer obtained. Optical or thermal polymerization is then performed to shape the form of the molds. Although each of the molds is made of glass, ceramics or a metal, glass, particularly glass having reinformed surfaces is generally used.

When a plastic lens is produced, a mold cavity is frequently formed by two opposite glass molds and a gasket for providing the plastic lens with a constant thickness and preventing leakage of the adjusted monomers filling. The mold cavity can be filled with the adjusted monomers by a method of injecting the adjusted monomers through a needle such as an injection needle which is inserted between the gasket and the glass molds.

Polymerization is then performed by applying active light such as ultraviolet light to the molds filled with the adjusted monomers, or heating the molds in an oven or a liquid bath. A combined method comprising optical polymerization and then thermal polymerization or thermal polymerization and then optical polymerization can also be used. In the optical polymerization, light containing a large quantity of ultraviolet light, such as light emitted from a mercury lamp as a light source, is generally applied to the molds. In the thermal polymerization, conditions in that the temperature is gradually increased from about room temperature to about 100° C. over several hours to several tens hours are preferred for maintaining the optical uniformity and quality of the polymerization product (such as a plastic lens and the like) and improving the reproducibility.

The sulfur-containing transparent polymer containing sulfur in its polymer molecule can be produced through the above-described processes. When the polymer obtained is used for a plastic lens, various coating processes for improving damage resistance by providing a hard coating layer on the surface, and increasing light transmittance by providing a multi-coat layer are combined for further increasing the value as the plastic lens.

The optical resin obtained in the present invention is preferably used for a spectacle lens, a camera lens, a pickup lens of a compact disk and other lenses for optical devices.

BEST MODE FOR CARRYING OUT THE INVENTION

The present invention is described in further detail below with reference to examples. The present invention is not limited to the examples.

In the examples, yellowness Y1 was measured by Color Computer SM-3 produced by Suga Shikenki Co., Ltd. The yellowness Y1 is an index obtained by the equation below and indicating the yellowness of the light transmitted by a sample. The greater the Y1 value is, the higher the yellowness becomes.

$$Y1=\{100(1.28X-1.062Z)\}/Y$$

X, Y, Z: tristomulus values of color

Total light transmittance was measured by an automatic direct-reading haze computer produced by Suga Shikenki Co., Ltd. Assuming that the quantity of incident light and the quality of transmitted light, both of which were received by an integrating sphere, were T1 and T2, respectively, the total light transmittance Tt is obtained by the following equation:

$$Tt=100 \cdot T2/T1$$

Light resistance was determined from a difference Y1 (the equation below) between yellowness (Y1)2 after irradiation of a sample with carbon arc light for 60 hours using Ultraviolet Regular Life Padeometer FA-3 produced by Suga Shikenki Co., Ltd. and yellowness (Y1)1 before the irradiation.

$$\Delta Y1=(Y1)2-(Y1)1$$

Refractive index was measured by using a Pulfrich refractometer.

EXAMPLE 1

0.5% by weight of benzoylperoxide was added to a monomer composition comprising 55.0% by weight of a compound having a structure shown by formula 1 below, 40.0% by weight of styrene, 3.5% by weight of mercaptoethylsulfide, and 1.0% by weight of t-butylhydroxytoluene. A mold comprising two glass plates and a polyester tape was then filled with the resultant mixture, and was heated to 40° to 110° C. over 14 hours.

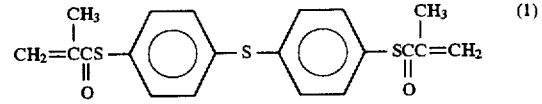

The mold was then removed to obtain a transparent resin having a thickness of 3 mm.

The thus-obtained resin was evaluated with respect to yellowness, total light transmittance, light resistance and refractive index. The results obtained are shown in Table 1.

EXAMPLE 2

0.5% by weight of benzoylperoxide was added to a monomer composition comprising 90.0% by weight of a compound having a structure shown by formula 2 below, 5% by weight of divinylbenzene, 4.0% by weight of mercaptoethylsulfide, and 0.5% by weight of t-butylhydroxytoluene. A resin plate was then produced and evaluated by the same method as that employed in Example 1. The results obtained are shown in Table 1.

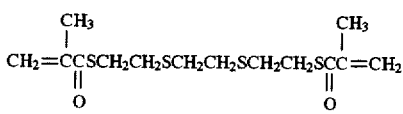

(2)

EXAMPLE 3

0.5% by weight of benzoylperoxide was added to a monomer composition comprising 90.0% by weight of a compound having a structure shown by formula 3 below, 5% by weight of styrene, 3.5% by weight of pentaerythritol tetrakisthiopropionate, and 1.0% by weight of t-butylhydroxytoluene. A resin plate was then produced and evaluated by the same method as in Example 1. The results obtained are shown in Table 1.

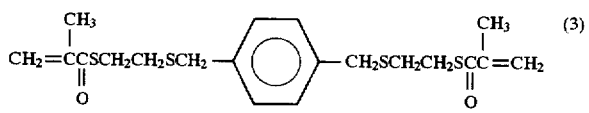

(3)

EXAMPLE 4

0.1% by weight of benzoylperoxide was added to a monomer composition comprising 89.7% by weight of a compound having a structure shown by formula 3, 7.5% by weight of α-methylstyrene, 2.5% by weight of pentaerythritol tetrakisthioglycolate, and 0.2% by weight of t-butylhydroxytoluene. A resin plate was then produced and evaluated by the same method as in Example 1. The results obtained are shown in Table 1.

COMPARATIVE EXAMPLE 1

0.49% by weight of benzoylperoxide was added to a monomer composition comprising 59.5% by weight of a compound having a structure shown by formula 1, 40.0% by weight of styrene, and 0.01% by weight of p-methoxyphenol. A resin plate was then produced and evaluated by the same method as in Example 1. The results obtained are shown in Table 1.

COMPARATIVE EXAMPLE 2

0.5% by weight of benzoylperoxide was added to a monomer composition comprising 90.0% by weight of a compound having a structure shown by formula 2, 9.48% by weight of divinylbenzene, and 0.02% by weight of t-butylhydroxytoluene. A resin plate was then produced and evaluated by the same method as in Example 1. The results obtained are shown in Table 1.

COMPARATIVE EXAMPLE 3

0.5% by weight of benzoylperoxide was added to a monomer composition comprising 94.49% by weight of a compound having a structure shown by formula 3, 5.0% by weight of styrene, and 0.01% by weight of t-butylhydroxytoluene. A resin plate was then produced and evaluated by the same method as in Example 1. The results obtained are shown in Table 1.

COMPARATIVE EXAMPLE 4

0.1% by weight of benzoylperoxide was added to a monomer composition comprising 91.39% by weight of a compound having a structure shown by formula 3, 8.5% by weight of α-methylstyrene, and 0.01% by weight of t-butylhydroxytoluene. A resin plate was then produced and evaluated by the same method as in Example 1. The results obtained are shown in Table 1.

TABLE 1

|  | Yellowness | Total light transmittance | Light resistance | Refractive index |
| --- | --- | --- | --- | --- |
| Example 1 | 2.0 | 88.0 | 24 | 1.65 |
| Example 2 | 1.9 | 88.1 | 0.8 | 1.63 |
| Example 3 | 1.6 | 88.1 | 1.5 | 1.65 |
| Example 4 | 1.6 | 88.0 | 1.5 | 1.65 |
| Comp. Ex.1 | 3.1 | 87.0 | 49 | 1.65 |
| Comp. Ex.2 | 2.9 | 86.6 | 1.7 | 1.63 |
| Comp. Ex.3 | 2.8 | 86.0 | 2.9 | 1.65 |
| Comp. Ex.4 | 3.1 | 86.9 | 3.1 | 1.65 |

INDUSTRIAL APPLICABILITY

The polymer obtained by polymerization is less colored, and a polymer which is hardly yellowed during use and which has high total light transmittance, high refractive index and light weight can be obtained.

We claim:

1. A method of producing a sulfur-containing transparent polymer comprising the steps of providing a composition comprising a (metha)acrylate monomer containing sulfur in its molecule, 0.1 to 7.0% by weight of a mercapto compound and a compound having a phenolic OH group, and radically polymerizing the composition.

2. A method of producing a sulfur-containing transparent polymer according to claim 1, wherein the (metha)acrylate monomer containing sulfur in its molecule is a monomer containing at least one thiol methacrylate group.

3. A method of producing a sulfur-containing transparent polymer according to claim 1, wherein the composition contains 1.0–5.0% by weight of the mercapto compound and 0.1–1.0% by weight of the compound having a phenolic OH group.

4. A method of producing a sulfur-containing transparent polymer according to claim 1, wherein the total of the mercapto compound and the compound having a phenolic OH group is 2.5 to 7.0% by weight.

5. A method of producing a sulfur-containing transparent polymer-according to claim 2, wherein the (metha)acrylate monomer contains at least two thiol methacrylate groups.

6. A method of producing a sulfur-containing transparent polymer according to claim 5, wherein the monomer containing at least two thiol methacrylate groups in its molecule is a thiol methacrylate of an aromatic dimercapto compound.

7. A method of producing a sulfur-containing transparent polymer according to claim 5, wherein the monomer containing at least two thiol methacrylate groups in its molecule is a thiol methacrylate of 1,4-bis(2-mercaptoethylenethiomethylene)benzene.

8. A method of producing a sulfur-containing transparent polymer according to claim 5, wherein the monomer containing at least two thiol methacrylate groups in its molecular is a thiol methacrylate of 4,4'-dimercaptophenylsulfide.

9. A method of producing a sulfur-containing transparent polymer according to claim 5, wherein the monomer containing at least two thiol methacrylate groups in its molecule is a thiol methacrylate of 1,2-bis(2-mercaptoethylenethio) ethane.

10. A method of producing a sulfur-containing transparent polymer according to claim 1, wherein the radical chain transfer compound having a mercapto group is pentaerythritol tetrakisthioglycolate.

11. A method of producing a sulfur-containing transparent polymer according to claim 1, wherein the radical chain transfer compound having a mercapto group is pentaerythritol tetrakisthiopropionate.

12. A method of producing a sulfur-containing transparent polymer according to claim 1, wherein the radical chain transfer compound having a mercapto group is mercaptoethylsulfide.

13. A method of producing a sulfur-containing transparent polymer according to claim 1, wherein the composition contains 1.0–5.0% by weight of the mercapto compound and 1.0–5.0% by weight of the compound having a phenolic OH group.

* * * * *